United States Patent Office 3,621,824
Patented Nov. 23, 1971

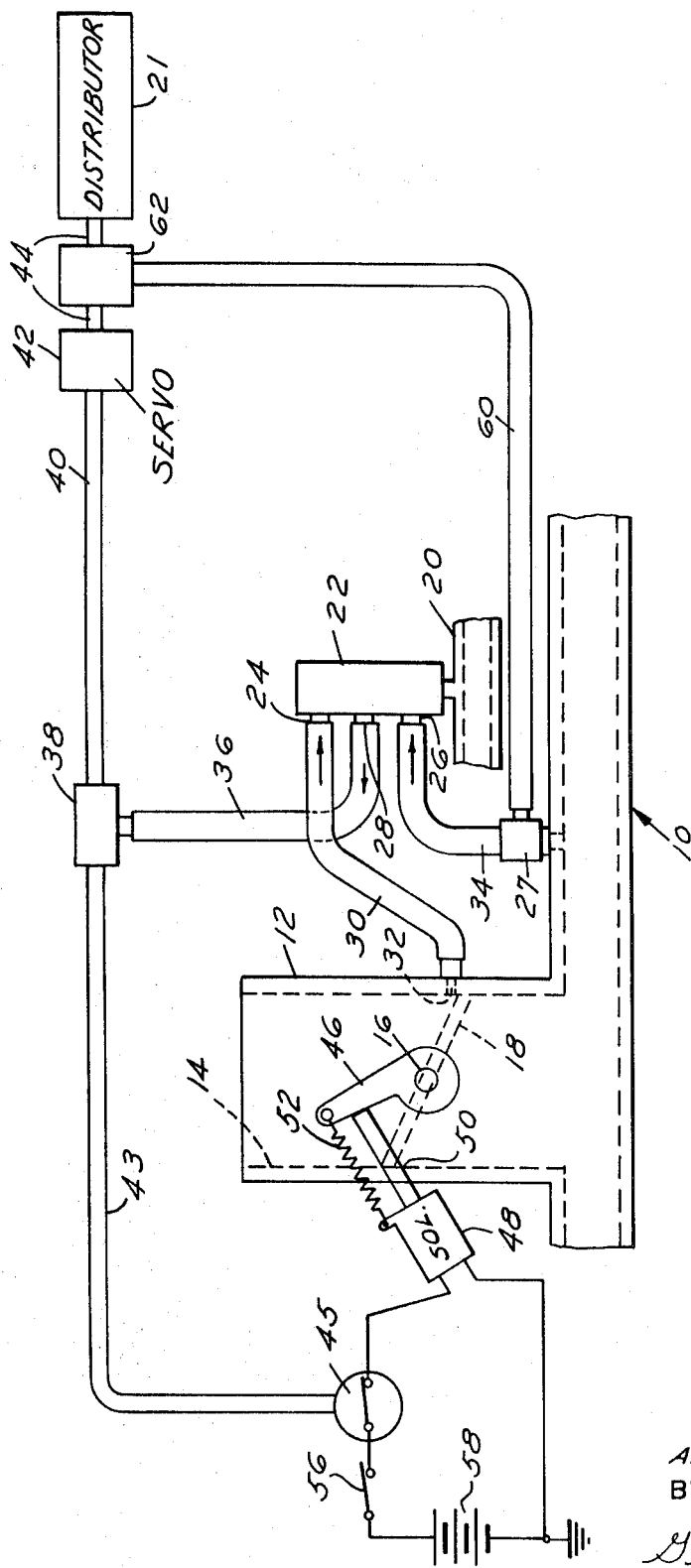

3,621,824
ENGINE TEMPERATURE CONTROL SYSTEM
Donald M. Burnia, Pontiac, and Alastair S. MacLennan,
Farmington, Mich., assignors to Ford Motor Company,
Dearborn, Mich.
Filed May 4, 1970, Ser. No. 34,219
Int. Cl. F02p 5/08
U.S. Cl. 123—117 A
4 Claims

ABSTRACT OF THE DISCLOSURE

A temperature responsive mechanism that applies intake manifold pressure to an ignition timing mechanism whenever engine temperature exceeds normal operating range interrupts an electrical circuit that deactivates a throttle positioning solenoid. The deactivated solenoid permits the throttle blade to move to a more closed position and thereby reduces engine idling overspeed resulting from the increased timing advance.

SUMMARY OF THE INVENTION

A retarded ignition timing for an idling internal combustion engine reduces significantly certain undesirable components in the engine exhaust. Virtually all present day automotive engines utilize this principle in varying degrees by retarding the ignition timing from the previously used more efficient values. Since retarded timing increases the engine operating temperature, mechanisms responsive to engine temperature have been included in the ignition timing system to eliminate the spark retardation when engine temperature rises to the point where damage to engine components might result. Advancing the ignition timing usually increases the engine idling speed by a significant value, typically about 200–500 r.p.m.

This invention provides a system for preventing any excessive idling speeds that might result from ignition timing changes of an internal combustion engine. In an engine having an ignition timing mechanism and a throttle blade for admitting air to an intake manifold of the engine, the system comprises a temperature responsive device capable of advancing the ignition timing of an idling engine whenever engine temperature exceeds a predetermined value. The predetermined value typically is near the top of the normal temperature range. A throttle blade positioning device capable of positioning the throttle blade in a slightly open position when the engine is idling in the normal temperature range is mounted on or near the carburetor. A mechanism connecting the temperature responsive device and the throttle blade positioning device provides a more closed position for the throttle blade whenever the temperature responsive device advances ignition timing because of excessive engine temperature.

The throttle blade positioning mechanism preferably comprises an electric solenoid that contacts the throttle blade to position the blade in a slightly open position when the solenoid is actuated. A conventional ignition switch in the solenoid circuit is closed whenever the engine ignition system is operating. In series with the ignition switch is a second switch that is connected to the temperature responsive device. When the temperature responsive device advances the ignition timing to correct an excessively high temperature condition encountered during engine idling, the second switch interrupts the solenoid circuit and permits the throttle blade to move to a less open position.

BRIEF DESCRIPTION OF THE DRAWING

The drawing is a partially schematic arrangement of the elements of the system showing the relationship of the elements to the carburetor, intake manifold, coolant passages and ignition distributor of an internal combustion engine.

DETAILED DESCRIPTION

In the drawing, numeral 10 designates the intake manifold of a reciprocating internal combustion engine. A carburetor 12 is mounted on manifold 10 and has an induction passage 14 for admitting air to the passages of the intake manifold. A rotatable shaft 16 passes through carburetor 12 and a throttle blade 18 is mounted thereon. Throttle blade 18 is positioned within induction passage 14 where the throttle blade controls the flow of air through the induction passage. The engine has a coolant passage 20 that is part of its cooling system. Coolant temperature remains within a predetermined range during normal engine operation, but can rise above that range during certain phases of engine operation in high ambient temperatures. A conventional ignition distributor 21 is mounted on the engine and controls the distribution of electrical energy to the spark plugs (not shown) in the conventional manner.

A temperature sensing valve mechanism 22 is mounted in coolant passage 20 where the mechanism will respond to changes in engine temperature. Valve mechanism 22 has a pair of inlet ports 24 and 26 and a single outlet port 28. Inlet port 24 is connected by a hose 30 to a carburetor spark port 32 that typically is located just above the idling position of throttle blade 18. A hose 34 connects the inlet port 26 through a T 27 with the passage in intake manifold 10.

Outlet port 28 is connected by a hose 36 to a T 38. One side of T 38 is connected by a hose 40 to an ignition timing advance mechanism 42 connected to ignition distributor 22. Mechanism 42 typically includes a vacuum motor connected by a rod 44 to a rotatable plate in ignition distributor 21. The other side of T 38 is connected via hose 43 to a vacuum actuated electrical switch 45.

A lever 46 is mounted on shaft 16 exterior of the carburetor induction passage. An electrical solenoid 48 is fastened to the carburetor by a bracket (not shown) in a position where its movable plunger 50 bears against lever-46. Lever 46 is urged against plunger 50 by a spring 52.

One side of the winding of solenoid 48 is connected to the negative or grounded terminal of the vehicle battery 58. The other side of the winding is connected through switch 45 and a manually actuated switch 56 in series therewith to the positive terminal of battery 58.

When solenoid 48 is inactive, plunger 50 is retracted to a location where spring 52 moves throttle blade 18 to a low speed idling position. Switch 56 is closed when the vehicle operator activates the vehicle ignition system. Switch 45 is normally closed but opens whenever the pressure applied thereto via line 43 falls below a predetermined value. The predetermined value is selected so the switch remains closed during all phases of normal operation but opens when exposed to the low pressures produced in intake manifold 10 during engine idling.

At coolant temperatures within the normal engine operating range, valve mechanism 22 connects ports 24 and 28. The pressure signal at spark port 32 then is applied to advance mechanism 42 which controls ignition timing advance accordingly. Hose 43 applies the same pressure to switch 45, but switch 45 remains closed because the pressures are above its predetermined actuating value.

During idling at normal temperatures, mechanism 42 holds ignition timing in a relatively retarded state. If desired, intake manifold pressure can be applied through hose 60 to a retard mechanism 62 that is connected to rod 44 to produce a more retarded timing at idling. Solenoid 48 is activated to open slightly throttle blade 18 to a position where increased fuel and air compensate for the reduced engine idling speeds caused by the retarded timing; the position is selected so the engine idles in the normal range of about 500-700 r.p.m.

If the engine idles for extended time periods in high ambient temperature conditions, which might occur during rush hour travel in some metropolitan areas, engine temperature might increase to the point where damage to engine components can occur. Valve mechanism 22 senses an excessive engine temperature from the coolant in passage 20 and connects port 28 to port 26 when an overtemperature condition occurs. The low intake manifold pressure then is applied to advance mechanism 42, which advances ignition timing to a point where engine operation produces less heat rejection. Advanced timing tends to produce an increase in engine idling speed, but switch 45 opens whenever idling intake manifold pressures are applied to mechanism 42 to deactivate solenoid 48. Plunger 50 retracts and spring 52 moves throttle blade 18 to a more closed position where the reduced fuel and air admitted to the engine decreases engine idling speed. The more closed position is selected so the speed reduction substantially balances the speed increase that would result from advanced ignition timing. System operation can occur without any tangible effect on vehicle operation.

In an alternate construction, an electrical switch replacing switch 45 can be located within the housing of temperature sensing mechanism 22. The switch can be actuated mechanically by the thermal element that moves the valve in mechanism 22.

Thus this invention provides a system for preventing excessive idling speeds of an internal combustion engine when ignition timing of an idling engine is advanced to reduce engine temperature. The system has no effect on road load operation since throttle blade 18 is free to open without interference from solenoid 48. When the vehicle operator deactivates the engine ignition system to shut off the engine, switch 56 opens to deactivate solenoid 48, which permits more complete closing of throttle blade 18 to prevent engine dieseling.

We claim:

1. A system for preventing excessive idling speed of an internal combustion engine having an ignition timing mechanism and a throttle blade admitting air to an intake manifold comprising temperature responsive means for advancing ignition timing of an idling engine whenever engine temperature exceeds a predetermined value, throttle blade positioning means for positioning the throttle blade in a slightly open position when the engine is idling at an engine temperature less than said predetermined value, said throttle blade positioning means including an electrical energy source and an electrical solenoid for contacting the throttle blade, and switch means coupling said solenoid to said energy source, said switch being operated by said temperature responsive means to operate said solenoid in a manner that positions the throttle blade in a more closed position whenever the temperature responsive means advances the ignition timing during engine idling.

2. The system of claim 1 in which the switch means connects the solenoid to the energy source to actuate the solenoid when the engine is operating at a temperature below said predetermined value and disconnects the solenoid from the energy source when engine temperature exceeds said predetermined value.

3. The system of claim 2 in which the ignition timing mechanism includes a vacuum motor for determining ignition timing and the temperature responsive means comprises a temperature sensing element fastened to the engine and a valve means connecting a carburetor spark port to said vacuum motor when engine temperature is below said predetermined value and connecting the intake manifold to the vacuum motor when engine temperature exceeds the predetermined value.

4. The system of claim 3 in which the switch means is a vacuum actuated switch, said vacuum actuated switch disconnecting the solenoid from the energy source when the valve means connects the intake manifold with the vacuum motor.

References Cited

UNITED STATES PATENTS

| | | | |
|---|---|---|---|
| 3,385,275 | 5/1968 | Burnia et al. | 123—117.1 |
| 3,400,698 | 9/1968 | Kelly | 123—117 A |
| 2,782,025 | 2/1957 | Olson | 123—103 X |
| 3,287,007 | 11/1966 | Schoeppach | 123—103 X |

LAURENCE M. GOODRIDGE, Primary Examiner